(12) United States Patent
Laumen et al.

(10) Patent No.: US 8,775,525 B2
(45) Date of Patent: *Jul. 8, 2014

(54) METHOD OF TRANSMITTING ELECTRONIC MAIL MESSAGES

(75) Inventors: Josef Laumen, Hildesheim (DE); Gunnar Schmidt, Wolfenbuettel (DE)

(73) Assignee: Ipcom GmbH & Co. KG, Pullach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/986,809

(22) Filed: Nov. 26, 2007

(65) Prior Publication Data

US 2008/0077677 A1    Mar. 27, 2008

Related U.S. Application Data

(63) Continuation of application No. 10/149,555, filed as application No. PCT/DE00/03897 on Nov. 8, 2000.

(30) Foreign Application Priority Data

Dec. 9, 1999 (DE) .................................. 199 59 528

(51) Int. Cl.
| | |
|---|---|
| *G06F 15/16* | (2006.01) |
| *H04W 4/00* | (2009.01) |
| *H04W 4/14* | (2009.01) |
| *H04L 12/58* | (2006.01) |
| *H04L 29/06* | (2006.01) |
| *H04M 7/12* | (2006.01) |
| *H04M 3/53* | (2006.01) |

(52) U.S. Cl.
CPC ............. *H04W 4/14* (2013.01); *H04L 12/5895* (2013.01); *H04M 2203/4536* (2013.01); *H04L 69/08* (2013.01); *H04M 7/12* (2013.01); *H04L 51/066* (2013.01); *H04L 29/06* (2013.01); *H04L 69/22* (2013.01); *H04M 2207/18* (2013.01); *H04M 3/5322* (2013.01); *H04L 12/5835* (2013.01)
USPC ........................... 709/206; 455/466; 709/236

(58) Field of Classification Search
USPC ........................... 709/204–207, 236; 455/466
See application file for complete search history.

(56) References Cited

U.S. PATENT DOCUMENTS

| | | | |
|---|---|---|---|
| 5,446,736 A | * | 8/1995 | Gleeson et al. ............... 370/473 |
| 5,706,434 A | | 1/1998 | Kremen et al. |

(Continued)

FOREIGN PATENT DOCUMENTS

| | | |
|---|---|---|
| DE | 298 16 131 | 1/1999 |
| DE | 29816131 U1 | 2/1999 |

(Continued)

OTHER PUBLICATIONS

"ETSI TS 100 901 V7.2.0 Technical Realization of the Short Message Service (SMS)", ETSI 1999, pp. 1, 2, 6, 7, 12-26, 51-71.*

(Continued)

*Primary Examiner* — Patrice Winder
*Assistant Examiner* — Julian Chang
(74) *Attorney, Agent, or Firm* — Nelson Mullins Riley & Scarborough LLP

(57) ABSTRACT

A method and a device for transmitting electronic mail messages using a mobile wireless telephone network short message service are provided. An electronic mail message is transmitted by using the at least one short message which includes a short message header portion and a short message data portion. The short message data portion includes a user data header portion having: a) an identifying data field to identify that the short message data portion includes addressing information in accordance with RFC 822, and b) a length data field identifying a length of the addressing information in accordance with RFC 822. The addressing information in accordance with RFC 822 includes data fields differentiated from one another by keywords.

16 Claims, 1 Drawing Sheet

(56) References Cited

U.S. PATENT DOCUMENTS

| | | | |
|---|---|---|---|
| 6,097,961 A | | 8/2000 | Alanara et al. |
| 6,167,402 A | * | 12/2000 | Yeager ................................. 1/1 |
| 6,178,331 B1 | * | 1/2001 | Holmes et al. ................. 455/466 |
| 6,519,234 B1 | * | 2/2003 | Werkander .................... 370/328 |
| 6,535,586 B1 | | 3/2003 | Cloutier et al. |

FOREIGN PATENT DOCUMENTS

| | | |
|---|---|---|
| EP | 0 777 394 | 6/1997 |
| EP | 1 240 758 | 9/2002 |
| EP | 1 243 107 | 9/2002 |
| WO | WO 99 52247 | 10/1999 |

OTHER PUBLICATIONS

RFC822, "Standard for the Format of ARPA Internet Text Messages", 1982.*

Martin, et al, "WAP Binary XML Content Format", Jun. 1999, W3C Note 24.*

ETSI TS 100901 Digital Cellular Telecommunications System (Phase 2+): Technical Realization of the Short Message Service (SMS): Point-to-Point (PP), GSM 03.40 version 7.3.0 Release 1998, ETSI Specification, Nov. 1999.

Technical Specification Group Terminals, Multimedia Messaging Service (MMS), Functional Description Stage 2 (2G TS23.140, Version 0.1.0), 1999

SMS-E-Mail Parameter, T2(99)-1068 Change Request to 23.040, Nov. 23, 1999.

Technical Realization of the Short Message Service (SMS): Point-to-Point (PP), GSM 03.40 V7.1.0 (Nov. 1998).

Technical Realization of the Short Message Service (SMS): Point-to-Point (PP), 3G 23.040 V3.2.0 (Oct. 1999).

Standard for the Format of ARPA Internet Text Messages, IETF, RFC 822, Aug. 13, 1982.

Alphabets and Language-Specific Information, GSM 03.38 version 7.2.0 Release 1998 (Jul. 1999).

Alphabets and Language-Specific Information, 3GPP 23.038 version 5.0.0 Release 5 (Mar. 2002).

SMS E-Mail Parameters, T2 (99)-1068 Change Request to 23.040, 3GPP SMG Meeting T2 No. 7, ETSI SMG4, Nov. 22, 1999 to Nov. 26, 1999, Ystad Sweden.

ETSI Technical Standard 03.40 version 7.2.0, Digital cellular telecommunications system (Phase 2+); Technical realization of the Short Message Service (SMS); Point-to-Point (PP) (GSM 03.40 version 7.2.0 Release 1998), Published by ETSI, Jul. 1999.

3GPP/SMG Meeting T2 #8/ETSI SMG4, Document T2(00)0129, 23.040 CR 011, "SMS E-Mail Parameters", Feb. 1-4, 2000.

Computer Networks 1996.

3G TS 23.040 V3.2.0 (Oct. 1999).

T2#7/SMG4 Report V 1.0 (Feb. 2000).

ETSI IPR Policy—Extracted from the ETSI Rules of Procedure, Nov. 22, 2000.

3GPP/SMG Meeting T2#7 / ETSI SMG4 Document T299=1068, 1999.

ETSI GSM Standard 03.40, Version 5.0.0 (Dec. 1995), p. 46.

Khare, Rohit, "W* Effect Considered Harmful," IEEE Internet Computing, vol. 3(4):89-92 (1999).

WAP Service Indication, "Wireless Application Protocol Service Indication Specification," Wireless Application Protocol Forum Ltd., 26 pages (1999).

McDysan, David E. et al., ATM Theory and Application, McGraw-Hill, p. 511 (1999).

Martin, Bruce et al., "WAP Binary XML Content Format," retrieved online at: http://www.w3.org/1999/06/NOTE-wbxml-19990624, 15 pages (1999).

* cited by examiner

METHOD OF TRANSMITTING ELECTRONIC MAIL MESSAGES

CROSS-REFERENCES TO RELATED APPLICATIONS

The present application is a continuation application of U.S. patent application Ser. No. 10/149,555 filed on Oct. 28, 2002, which is in turn a U.S. national-phase application under 35 U.S.C. §371 based on international application PCT/DE00/03897 filed on Nov. 8, 2000.

FIELD OF THE INVENTION

The present invention relates to a method of transmitting electronic mail messages.

BACKGROUND INFORMATION

The publication "SMS-E-Mail Parameter," T2(99)-1068 Change Request to 23.040 discusses a method of transmitting Internet e-mail using the SMS short message service, an Internet e-mail plus address and identification data are transmitted with an SMS short message in a telecommunications network in various headers of the SMS short message for transmission of Internet e-mail over the Internet.

SUMMARY OF THE INVENTION

The exemplary method according to the present invention for transmitting electronic mail messages provides for transmission of a first header, including several data fields including the address and identification data, with the short message. In this manner, it is not necessary to define multiple headers for transmission of the address and identification data, thus eliminating the amount of data required for defining additional headers. This is beneficial in particular for short messages, which are limited to a given data volume, so that a maximum data capacity is available in the short message for the electronic mail message to be transmitted with the short message.

The data fields are identified by keywords for transmission in the first header. In this manner, the data fields may be differentiated unambiguously without using excessive resources.

The keywords are transmitted in coded form. The negative effect on the data capacity of the short message due to transmission of the keywords is thus minimized.

An identifying data field which identifies the structure of the first header is transmitted together with the first header. This guarantees error-free analysis of the first header in a first receiver of the short message, so that the electronic mail message contained in the short message may be transmitted to the correct second receiver(s) in the second communications network.

A second header is transmitted with the short message, indicating the presence of the first header. This ensures that the header is actually analyzed in the first receiver, to cause the first receiver to relay the useful data contained in the short message to a second receiver in a second communications network as an electronic mail message.

At least one third header is transmitted together with the short message, identifying the electronic mail message as part of an overall electronic mail message concatenated by transmission of multiple short messages. In this manner, in particular in the case of short messages limited to a given data volume, an electronic mail message is sent which exceeds the given data volume by concatenation of multiple short messages in the first communications network, in which case the electronic mail messages of the short messages concatenated together via at least one third header may be combined into one overall electronic mail message and sent to at least one second destination address given in the first header.

One exemplary embodiment of the present invention is illustrated in the drawing and is explained in greater detail in the following description.

DETAILED DESCRIPTION

Figure 1:
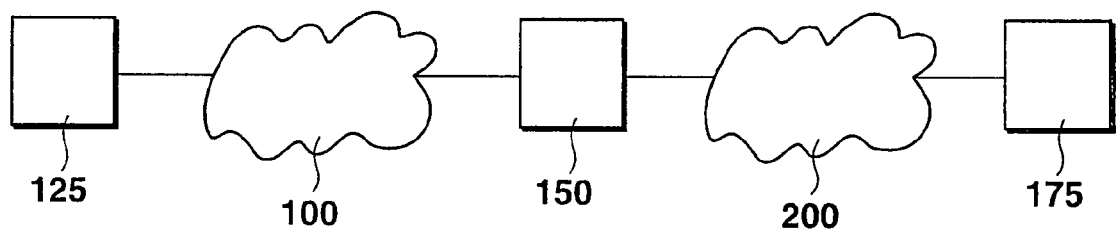
FIG. 1 shows a transmission link from a sender to a receiver.

FIG. 1 shows a sender 125 which transmits a short message including an integrated electronic mail message to a first receiver 150 over a first communications network 100. First receiver 150 extracts the electronic mail message from the short message and relays it to a second receiver 175 over a second communications network 200.

Figure 2:
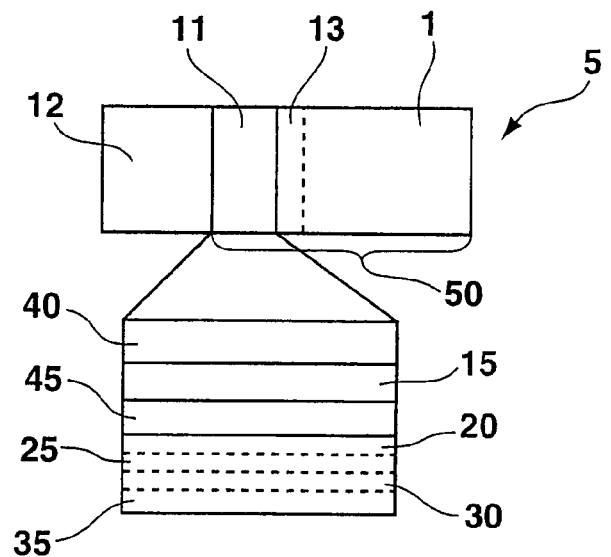
FIG. 2 shows a schematic diagram of a short message including an integrated electronic mail message.

FIG. 2 shows a short message 5. Short message 5 is generated by sender 125 of the first communications network and is transmitted over first communications network 100 to first receiver 150 of first communications network 100. A short message service is set up in first communications network 100 for transmission of such short messages 5. Such a short message service exists, for example, in a first communications network 100, which is configured as a mobile wireless network. Such a mobile wireless network may be, for example, a mobile wireless network according to the GSM standard (Global System for Mobile Communications) or according to the UMTS standard (Universal Mobile Telecommunications System). In the case of the GSM mobile wireless network, the SMS short message service is specified, making available the transmission of SMS short messages between a sender and a receiver, the SMS short messages are limited to text messages with a maximum text length of 160 characters at the present time. If larger text messages are to be transmitted, the SMS short message service may allow concatenation of multiple SMS short messages, i.e., the text message to be transmitted is distributed among multiple SMS short messages.

Short message 5 illustrated in FIG. 2 basically includes a second header 12 and a data portion 50. Second header 12 includes signaling entries and a first destination address for short message 5 to be sent and a source address for short message 5 to be received. The first destination address identifies first receiver 150 of short message 5 in first communications network 100, and the source address identifies sender 125 of short message 5 in first communications network 100. Data portion 50 includes the message actually to be transmitted and thus the useful data. In the SMS short message service, the source address and the first destination address are identified by an MSISDN number (Mobile Subscriber Integrated Services Digital Network) according to the publications "Technical Realization of the Short Message Service (SMS): Point-to-Point (PP)," GSM 03.40 V7.1.0 (1998-11) and "Technical Realization of the Short Message Service (SMS): Point-to-Point (PP)," 3G 23.040 V3.2.0 (1999-10). In transmission of short message 5 in first communications network 100, a network unit (not shown in FIG. 1) of first communications network 100 addresses first receiver 150 of the short message on the basis of the first destination address and replaces it with the source address of sender 125. According to the standard, second header 12 then contains one source address or one first destination address.

Short message 5 according to FIG. 2 includes a first header 11 which is arranged in data portion 50 of short message 5. First header 11 is referred to as user data header in the SMS short message service.

The presence of first header 11 in data portion 50 is indicated by a corresponding signaling entry in second header 12. In the case of the SMS short message service, various types of user data headers are specified according to the cited publications "Technical Realization of the Short Message Service (SMS): Point-to-Point (PP)." They are differentiated from one another by an identifying data field 15 in first header 11 according to FIG. 2, where FIG. 2 shows the structure of first header 11 in detail.

Then an electronic mail message 1 may be transmitted in data portion 50 of short message 5. Short message 5 including electronic mail message 1 is transmitted to first receiver 150 of first communications network 100, which is also a subscriber of second communications network 200, electronic mail message 1 to be transmitted from first receiver 150 to second receiver 175 of second communications network 200. Second communications network 200 may be the Internet, for example, in which case electronic mail message 1 is then an Internet e-mail, for example.

Then several data fields 20, 25, 30, 35 containing address and identification data for transmission of electronic mail message 1 in second communications network 200 are transmitted together with first header 11. After analysis of this address and identification data in first receiver 150 of short message 5, which may be a service center of first communications network 100 and/or second communications network 200, for example, electronic mail message 1 may be forwarded to second receiver 175 of second communications network 200. To do so, however, first receiver 150 of short message 5 must be notified of how first header 11 is structured and whether such data fields 20, 25, 30, 35 are present in first header 11. This is done on the basis of identifying data field 15. In this case, an identifier indicates how the address and identification data is present in first header 11. For example, the identifier may indicate that data fields 20, 25, 30, 35 of first header 11 include addressing and identification of electronic mail message 1, as referred to in the publication "Standard for the Format of ARPA Internet Text Messages" IETF, RFC 822. In FIG. 2, for example, first header 11 for RFC 822 addressing according to this publication is shown. First header 11 is preceded by a first length data field 40 which indicates the UDHL (user data header length) of first header 11. First length data field 40 is then followed by identifying data field 15 discussed above, including an identifier IEI (information element identifier) which in this case indicates that data fields 20, 25, 30, 35 represent RFC 822 addressing. Identifying data field 15 is followed by a second length data field 45 which indicates the IEIDL (information element identifier data length) of data fields 20, 25, 30, 35. Second length data field 45 is then followed by data fields 20, 25, 30, 35, which are differentiated from one another by keywords, one keyword is assigned to each data field 20, 25, 30, 35. These keywords are known to first receiver 150 of short message 5. Since unambiguous identification of data fields 20, 25, 30, 35 is performed on the basis of the given keywords, data fields which differ in type and number may be arranged in first header 11, depending on the desired application. According to FIG. 2, four data fields 20, 25, 30, 35 are provided. However, there may also be a greater or lesser number. A first data field 20 is a destination address data field, for example, including a second destination address of electronic mail message 1 and thus second receiver 175 of electronic mail message 1 in second communications network 200. Therefore, destination address data field 20 is indispensable for forwarding electronic mail message 1 in second communications network 200, but it may be arranged at any desired location in the area of the data fields in first header 11 due to the assigned keyword, because short message 5 is identified unambiguously on the basis of the key word in first receiver 150. The same thing is true of all other data fields. A second data field 25 of first header 11 may be a source address data field and may include the source address of electronic mail message 1, so that sender 125 of electronic mail message 1 is identifiable at second receiver 175 of electronic mail message 1 in second communications network 200.

A third data field 30 of first header 11 may be a title data field, which includes a subject or title of electronic mail message 1.

A fourth data field 35 of first header 11 may be a name data field, which includes the name of sender 125 of electronic mail message 1, not in the form of the source address, but instead in the form of a first name and a last name, i.e., as a personal name.

The allocation of data fields to keywords may be as follows, for example: the keyword "to" is assigned to the destination address data field. The keyword "from" is assigned to source address data field 25. The key work "subject" is assigned to title data field 30. Name data field 35 is not used in this example.

An example of the structure of first header 11 is discussed below. Second header 12 contains the signaling entry TP-UDHI (transfer protocol user data header identification) which indicates whether first header 11 is included in short message 5. If this is the case, TP-UDHI is set at 1, otherwise TP-UDHI is set at 0. First header 11 may have the following structure, for example. Length UDHL of first header 11 is set at 39 in the hexadecimal system in first length data field 40. Identifier IEI is set at 20 in the hexadecimal system in identifying data field 15 and references through this value the RFC 822 address discussed above according to a corresponding allocation table. Length IEIDL of data fields 20, 25, 30 of first header 11 is set at 37 in the hexadecimal system in second length data field 45. In destination address data field 20, the keyword "to" with the following character string of 27 characters references a second destination address as an Internet address for electronic mail message 1, which in this example is Internet e-mail:
To=Gunnar.Schmidt@Bosch.com In source address data field 25, the keyword "from" references a source address, which is also an Internet address, for identification of sender 125 of electronic mail message 1, the following character string of 23 characters is formed in source address data field 25:
From=+49xxxyyyyy@zzz.de The source address is obviously an Internet e-mail address which includes a telephone number and is not personalized. Personalized identification of sender 125 of electronic mail message 1 is performed by using name data field 35 as discussed above, but it is not provided in this example.

In this example, a character string of 12 characters is provided in title data field 30, in which the keyword "subject" references the title of electronic mail message 1 as follows:
Subject=Test No additional data fields are provided in first header 11 in this example. On the whole, three data fields 20, 25, 30 used here in this example include 62 characters, which may be binary coded with 7 bits, for example, so a total of 55 bytes are required for coding. The number 55 in the decimal system corresponds to the number 37 in the hexadecimal system and thus corresponds to the value provided for IEIDL.

In the example discussed here, individual data fields 20, 25, 30 are identified unambiguously not only through keywords, but also separately from one another. This means that the content of each data field 20, 25, 30 must not include any keywords. Therefore, each data field 20, 25, 30 is concluded with a separation character. Then the character string for destination address data field 20 would be as follows, starting from the above example:

To=Gunnar.Schmidt@Bosch.com<CR>

<CR>, i.e., "carriage return" has been selected as the separation character here. This lengthens the character string to a total of 28 characters.

Also as an alternative to the example discussed here, the characters may be binary coded in 8 bits. This would increase the supply of characters but would further reduce the number of characters for electronic mail message 1.

In the example discussed here, fewer than 100 characters remain for actual electronic mail message 1 in data portion 50 of short message 5 if based on a short message 5 according to SMS standard and the current limit of 160 characters per short message in this SMS standard.

7-bit binary coding is sued for the keywords of the RFC 822 address discussed here to save on characters. This may be accomplished by using a given reference table which is known in sender 125 and in first receiver 150 of first communications network 100 and may have the following aspect, for example:

| Keyword | Binary code (7 bit) |
|---------|---------------------|
| To: | <0000000> |
| From: | <0000001> |
| Cc: | <0000010> |
| Bcc: | <0000011> |
| Subject: | <0000100> |
| ... | ... |

In addition to the keywords "to," "from" and "subject" already discussed above, the table also contains the following additional keywords: "cc" and "bcc." Moreover, the table indicates that in addition to the extra keywords already discussed, other keywords may also be provided. For each keyword used in first header 11, a data field is provided in first header 11 in the manner discussed here. Keywords "cc" and "bcc" identify additional destination addresses to which electronic mail message 1 is to be transmitted in second communications network 200 besides the second destination address given under the keyword "to."

As an alternative to the example discussed here, the keywords may also be binary coded with 8 bits.

According to the example discussed above, the following would then be obtained by coding the keywords in first header 11: in first length data field 40, UDHL would be set at 2d in the hexadecimal system. In identifying data field 15, IEI would still be set at 20 in the hexadecimal system to reference the RFC 822 addressing as discussed above. In second length data field 45, IEIDL would be set at 2b in the hexadecimal system. Through the coding of the keyword "to" according to the table with the character <0000000>, the character string in destination address data field 20 would now include 25 characters and would have the following aspect:
<0000000>Gunnar.Schmidt@Bosch.com By coding the keyword "from" with the character <0000001> according to the table, source address data field 25 would then include a character string of 19 characters and would appear as follows:
<0000001>+41xxxyyyyy@zzz.de By coding the keyword "subject" with the character <0000100> according to the table, the identifying data field 30 would then include a character string of five characters and would appear as follows:
<0000100>Test Thus there are now 49 characters for data fields used 20, 25 and 30 requiring 43 bytes in binary coding of 7 bits each, the number 43 in the decimal system corresponding to the number 2b in the hexadecimal system and thus corresponding to the value provided for IEIDL.

This makes it possible to save on characters which may then be made available for electronic mail message 1.

The difference in the values provided for IEIDL and UDHL in the example discussed here is due to the fact that characters must also be used for first length data field 40, second length data field 45 and identifying data field 15. The difference between the value for UDHL and the value for IEIDL in each of these two examples is two bytes, so that a maximum of 16 binary places are available for first length data field 40, second length data field 45 and identifying data field 16.

At least one third header 13 may be transmitted together with short message 5 in addition to first header 11, identifying electronic mail message 1 as part of complete electronic mail message 1 concatenated by transmission of multiple short messages. The order of first header 11 and third header 13 may also be reversed. Only second header 12 should stand at the beginning of short message 5. Other headers may also be added to short message 5 in any desired order with first header 11 and optionally third header 13, in which case second header 12 must always stand at the beginning of short message 5. Since third header 13 may be optional, it is shown with broken lines in FIG. 2. Third header 13 differs from first header 11 in any case through the identifier in identifying data field 15. On the basis of this identifier, first receiver 150 in first communications network 100 may differentiate between first header 11 and third header 13.

Third header 13 must also contain an identifier which identifies the complete electronic mail message. In first receiver 150 of first communications network 100, then all electronic mail messages received via short messages are concatenated to form the complete electronic mail message which is referenced by the identification of this complete electronic mail message and transmitted in this form as a complete concatenated electronic mail message to second receiver 175 in second communications network 200 addressed by second destination address in destination address data field 20 according to respective first header 11 of corresponding short messages 5. Third header 13 may also contain a sequence number indicating the location at which electronic mail message 1 of respective short message 5 stands in the concatenated complete electronic mail message, so that multiple electronic mail messages identified in this manner may be concatenated in the correct order in first receiver 150 of first communications network 100. A separate header may be provided in short message 5 for identification of the complete electronic mail message and for identification of the sequence number of the respective electronic mail message and to differentiate them from one another with a corresponding identifier in identifying data field 15.

By analysis of first header 11, first receiver 150 in first communications network 100 is capable of extracting electronic mail message 1 from data portion 50 of short message 5, because first header 11 and optionally other headers of data portion 50 such as third header 13 always precede the useful data in data portion 50 and have a length data field from which their length may be determined. Then, in addition, the information required for addressing and identification of electronic mail message 1 is obtained from first header 11, this information is necessary for transmission of extracted electronic mail message 1 in second communications network 200 to second receiver 175 addressed there and identification of sender 125 at second receiver 175. For pure transmission of electronic mail message 1 to second receiver 175 of second communications network 200, of the data fields that may be used, only destination address data field 20 in first header 11 is indispensable. Source address data field 25 and name data field 35 merely identify sender 125, and title data field 30 merely provides the title and thus the identification of electronic mail message 1 itself. From third header 13, the presence of which is also referenced by a corresponding signaling entry in second header 12, first receiver 150 of short message 5 in first communications network may recognize whether electronic mail message 1 is part of a complete electronic mail message to be concatenated. On the basis of another header (not shown in FIG. 2), the presence of which is also referenced by a corresponding signaling entry in second header 12, first receiver 150 in first communications network 100 may recognize in which position of the complete electronic mail message to be concatenated electronic mail message 1 of short message 5 stands, unless this information is already contained in third header 13.

According to the position determined for electronic mail message 1 in the complete electronic mail message to be concatenated, first receiver 150 in first communications network 100 may insert electronic mail message 1 of short message 5 into the corresponding location of the complete electronic mail message to be concatenated.

The exemplary method according to the present invention is not limited to the SMS short message service in the GSM mobile wireless network, but instead it may also be used for any desired short message services in which electronic mail messages are transmitted with short messages, and the electronic mail message need not be Internet e-mail.

What is claimed is:

1. A method of transmitting electronic mail messages using a mobile wireless telephone network short message service, comprising:
   transmitting at least one short message by using the mobile wireless telephone network short message service;
   preparing an electronic mail message to be transmitted by means of the at least one short message;
   incorporating a short message header portion and a short message data portion in the at least one short message;
   incorporating a user data header portion in the short message data portion, the user data header portion preceded by a user data header length field, the user data header portion having an identifying data field, only a single length data field, and a plurality of addressing information data fields;
   indicating, using the identifying data field, that the short message data portion includes addressing information in accordance with RFC 822;
   indicating, using the single length data field, a length of the entire addressing information in accordance with RFC 822;
   incorporating the entire addressing information in accordance with RFC 822 in the plurality of addressing information data fields of the user data header portion, said addressing information data fields being differentiated from one another by predetermined code values representative of keywords; and
   transmitting the electronic mail message by means of the at least one short message.

2. The method of claim 1, wherein said electronic mail message is transmitted using a plurality of short messages, and wherein said short message data portion further includes an identifier for identifying said electronic mail message.

3. The method of claim 1, wherein said electronic mail message is transmitted using a plurality of short messages, and wherein said short message data portion further includes a sequence number identifier of a sequence of short messages for concatenation of said short messages in a correct order.

4. The method of claim 1, wherein said electronic mail message is transmitted using a plurality of short messages, and wherein said short message data portion further includes an identifier for identifying said electronic mail message, and wherein said short message data portion further includes a sequence number identifier of a sequence of short messages for concatenation of said short messages in a correct order.

5. The method of claim 1, wherein said mobile wireless telephone network operates according to the GSM standard.

6. The method of claim 1, wherein said mobile wireless telephone network operates according to the UMTS standard.

7. The method of claim 1, wherein said short message header portion includes signaling entries, a destination address and a source address.

8. The method of claim 7, wherein the destination address and the source address are identified by a MSISDN number.

9. A transmitting apparatus for transmitting electronic mail messages using a mobile wireless telephone network short message service, comprising:
   an arrangement configured to:
      preparing an electronic mail message to be transmitted by means of at least one short message;
      incorporate a short message header portion and a short message data portion in the at least one short message;
      incorporate a user data header portion in the short message data portion, the user data header portion preceded by a user data header length field, the user data header portion having an identifying data field, only a single length data field, and a plurality of addressing information data fields;
      indicate, using the identifying data field, that the short message data portion includes addressing information in accordance with RFC 822;
      indicate, using the single length data field, a length of the entire addressing information in accordance with RFC 822;
      incorporate the entire addressing information in accordance with RFC 822 in the plurality of addressing information data fields of the user data header portion, said addressing information data fields being differentiated from one another by predetermined code values representative of keywords; and
      transmit the electronic mail message using the at least one short message.

10. The transmitting apparatus of claim 9, wherein said short message data portion further includes an identifier for identifying said electronic mail message in the event that said electronic mail message is transmitted using a plurality of short messages.

11. The transmitting apparatus of claim 9, wherein said short message data portion further includes a sequence number identifier of a sequence of short messages for concatenation of said short messages in a correct order in the event that said electronic mail message is transmitted using a plurality of short messages.

12. The transmitting apparatus of claim 9, wherein said short message data portion further includes an identifier for identifying said electronic mail message, and wherein said short message data portion further includes a sequence number identifier of a sequence of short messages for concatenation of said short messages in a correct order in the event that said electronic mail message is transmitted using a plurality of short messages.

13. The transmitting apparatus of claim 9, wherein said transmitting unit is configured to operate according to the GSM standard.

14. The transmitting apparatus of claim 9, wherein said transmitting unit is configured to operate according to the UMTS standard.

15. The transmitting apparatus of claim 9, wherein said short message header portion includes signaling entries, a destination address and a source address.

16. The transmitting apparatus of claim 15, wherein the destination address and the source address are identified by a MSISDN number.

* * * * *